United States Patent
Adler et al.

(10) Patent No.: US 9,162,410 B2
(45) Date of Patent: Oct. 20, 2015

(54) COMPRESSION OF A WATER-SATURATED MEDIUM

(75) Inventors: Robert Adler, Gerasdorf (AT); Sascha Dorner, Vienna (AT); Georg Siebert, Vienna (AT); Martin Stehrlein, Rust (AT)

(73) Assignee: Linde Aktiengesellschaft, Munich (DE)

( * ) Notice: Subject to any disclaimer, the term of this patent is extended or adjusted under 35 U.S.C. 154(b) by 656 days.

(21) Appl. No.: 13/467,108

(22) Filed: May 9, 2012

(65) Prior Publication Data

US 2013/0118362 A1 May 16, 2013

(30) Foreign Application Priority Data

May 13, 2011 (DE) .................. 10 2011 101 504

(51) Int. Cl.

| | |
|---|---|
| F04F 1/00 | (2006.01) |
| B01D 53/14 | (2006.01) |
| B30B 9/00 | (2006.01) |
| C10M 105/54 | (2006.01) |
| C10M 105/70 | (2006.01) |
| F04F 1/10 | (2006.01) |
| F04B 37/20 | (2006.01) |
| F04B 39/00 | (2006.01) |
| F04F 1/02 | (2006.01) |
| F04F 1/14 | (2006.01) |

(52) U.S. Cl.
CPC ............ *B30B 9/00* (2013.01); *C10M 105/54* (2013.01); *C10M 105/70* (2013.01); *F04B 37/20* (2013.01); *F04B 39/0011* (2013.01); *F04F 1/00* (2013.01); *F04F 1/02* (2013.01); *F04F 1/10* (2013.01); *F04F 1/14* (2013.01); *C10M 2213/06* (2013.01); *C10M 2215/0865* (2013.01); *C10M 2215/2245* (2013.01); *C10M 2219/0406* (2013.01); *C10N 2220/04* (2013.01); *C10N 2240/08* (2013.01); *Y02E 60/324* (2013.01)

(58) Field of Classification Search
None
See application file for complete search history.

(56) References Cited

U.S. PATENT DOCUMENTS

| | | | | |
|---|---|---|---|---|
| 4,303,372 | A | * | 12/1981 | Caffrey .................. 415/169.2 |
| 4,685,509 | A | * | 8/1987 | Koeller ..................... 165/47 |
| 2004/0179957 | A1 | * | 9/2004 | Choroszylow et al. ....... 417/313 |
| 2007/0258828 | A1 | * | 11/2007 | Adler et al. ................. 417/46 |
| 2012/0118011 | A1 | * | 5/2012 | Terrien et al. ................ 62/619 |

\* cited by examiner

*Primary Examiner* — Duane Smith
*Assistant Examiner* — Phillip Shao
(74) *Attorney, Agent, or Firm* — Philip H. Von Neida

(57) ABSTRACT

A method and device for compressing a gas-phase medium, particularly hydrogen or natural gas, wherein the medium may have a water content up to total saturation with water and wherein the medium is compressed in a single or multiple stages in at least one liquid-filled chamber. The liquid(s) that is/are used are an ionic liquid that is not susceptible to attack by the water contained in the medium to be compressed and/or a liquid with low vapor pressure that is not susceptible to attack by the water contained in the medium to be compressed, and the compressed medium undergoes a water separation stage.

7 Claims, 1 Drawing Sheet

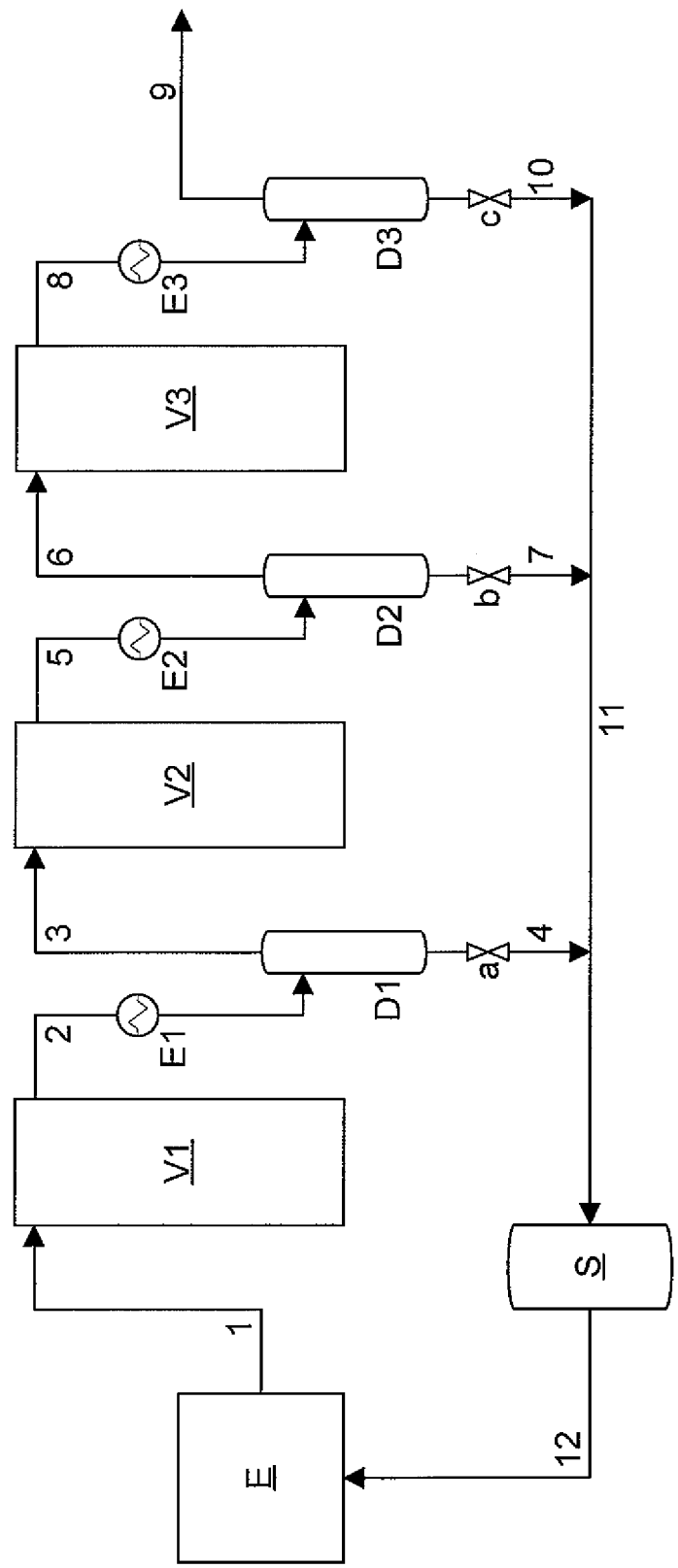

COMPRESSION OF A WATER-SATURATED MEDIUM

CROSS REFERENCE TO RELATED APPLICATIONS

This application claims priority from German Patent Application No. 102011101504.7, filed May 13, 2011.

BACKGROUND OF THE INVENTION

The invention relates to a method and a device for compressing a gas-phase medium, particularly hydrogen or natural gas, wherein the medium may have a water content as high as complete saturation with water and wherein the medium is compressed in a single or multiple stages in at least one liquid-filled chamber.

A species-related method and species-related device for compressing a gas-phase medium are known from German patent application 102004046316. In methods and devices of such kind, the gas-phase medium is compressed in a liquid column. Ionic liquids in particular have proven to be useful as liquids in such columns, because they do not mix with the medium that is being compressed and can be separated from the compressed medium without residue. Species-related methods are also used for compressed any gas-phase media that have been or are contaminated with water as a consequence of their production, processing or their natural occurrence.

Ionic liquids are low melting, organic salts with melting points between 100 and 90° C., and most known ionic liquids are already in the liquid state at room temperature. Unlike conventional molecular liquids, ionic liquids are entirely ionic and accordingly they possess new and unusual properties. The properties of ionic liquids can be adapted fairly readily to existing technical problems by varying the structure of the anion and/or cation and by varying their combinations. Unlike conventional, molecular liquids, ionic liquids also have the advantage that they do not have any measurable vapor pressure. This means that not even the slightest traces evaporate—even in a high vacuum—until their decomposition temperature is reached. This is the aspect that is behind their other properties of nonflammability and environmental compatibility, because ionic liquids thus cannot escape into the atmosphere, Moreover, ionic liquids are very thermostable. The decomposition points of most are above 400° C. Density and mixing behavior with other liquids can be modified or adjusted for most ionic liquids by appropriate selection of the ions. Ionic liquids also have the further advantage that they are electrically conductive, so that accordingly they can prevent the buildup of electrical charges—which present potential hazard, Species-related methods and devices are used particularly for compressing gas-phase hydrogen or natural gas. In this context, until now the problem that has presented itself has been that the hydrogen to be compressed inevitably contains water by virtue of the method of its production—by electrolysis for example. Previously, this had to be removed completely before proceeding with the actual compression, because it must not be allowed to come into contact with the previously known ionic liquids, since it would attack and destroy them. For this reason, until now it has been necessary to provide fairly complicated devices or systems for separating the water. In the case of oxygen production by electrolysis, for example, molecular sieves are used. However, these need energy because they have to be heated cyclically, and they also consume a portion of the valuable hydrogen, which is used as the purge gas for regenerating the molecular sieve. The necessary separation of the water thus makes hydrogen generation more expensive. Furthermore, devices of such kind require a certain degree of maintenance, which further raises the cost of generating hydrogen. The same problems are also encountered when compressing other media, such as natural gas for example, which must be compressed for use in refueling vehicles.

SUMMARY OF THE INVENTION

The object of the present invention is to suggest a species-related method and a species-related device for compressing a gas-phase medium that avoid the disadvantages outlined in the preceding.

In terms of the method, the object as stated is solved by using as the liquid an ionic liquid that is selected from the group consisting of a liquid that is not susceptible to attack by the water in the medium to be compressed and a liquid with low vapor pressure that is not susceptible to attack by the water in the medium to be compressed, and by subjecting the compressed medium to a water separation process.

The device according to the invention for compressing a gas-phase medium comprises at least one compression stage, in which an ionic liquid that is not susceptible to attack by the water in the medium to be compressed and/or a liquid with low vapor pressure that is not susceptible to attack by the water in the medium to be compressed is/are used as the liquid, and at least one water separation device connected downstream of the compression stage or stages.

The heart of the present invention is the combination of a single-stage or multistage compression process with a special ionic liquid and a water separation system connected downstream from the compression facility. The water separation plant that was previously located upstream of the compression facility and the disadvantages associated therewith are thus eliminated. Ionic liquids at are not susceptible to attack by the water contained in the medium to be compressed, and are therefore not impaired or destroyed thereby have been known in principle for a long time, but their potential usefulness in this respect has not previously been recognized and exploited.

Further advantageous configurations of the method according to the invention and of the device according to the invention for compressing a gas-phase medium that represent the objects of the dependent claims are characterized in that
the compressed medium undergoes a water separation cycle after each compression stage,
the compressed medium is cooled before it is fed into the water separation plant,
EMIM mesylate, preferably EMIM mesylate with additive, or 1-butyl-2,3-dimethyl imidazolium-bis(trifluoromethyl sulfonyl)imide is used as the ionic liquid, and/or
a perfluorinated polyether or a thermal oil with low vapor pressure is used as the liquid with low vapor pressure.

The method according to the invention and the device according to the invention for compressing a gas-phase medium will be explained in the following with reference to the exemplary embodiment represented in the single FIGURE.

BRIEF DESCRIPTION OF THE DRAWINGS

The FIGURE is a diagrammatic representation of an electrolyzer E and a compression unit, comprising three compression stages V1, V2 and V3.

DETAILED DESCRIPTION OF THE INVENTION

The hydrogen generated in electrolyzer E has a water content of about 8% by volume. This stream is fed directly and without processing via line 1 into first compression stage V1 where it is compressed to a first intermediate pressure. In the case of a multistage compression process, as is shown in the FIGURE the intermediate pressure or pressures is/are determined to a large degree by the final pressure to be reached and by the quantity that is to be compressed.

Compared with compression of a ready processed flow of hydrogen that has already been dewatered, the compression in compressor stage V1 requires more energy, because the water or steam must also be compressed at the same time. However, this increased energy consumption is justified in view of the losses that are associated with the cleaning and separation systems that have been necessary in the past and is compensated by the advantages gained.

The stream of hydrogen that has been compressed in first compression stage V1 is extracted via line 2, cooled in first heat exchanger E1 against a suitable cooling medium, preferably water, and passed to a first (high pressure) separator D1. While a largely water-free stream of hydrogen is extracted at the head of separator D1 via line 3 and forwarded to second compression stage V2, the water that is condensed out in separator D1 is extracted via line 4.

The hydrogen stream 5 is compressed in second compressor V2 and cooled in the downstream second heat exchanger E2, then forwarded to second (high pressure) separator D2. The water that is precipitated here is discharged via line 7. The hydrogen fraction extracted from second separator D2 via line 6 is forwarded to third compressor stage V3 where it is compressed to the desired final pressure. It should be emphasized that the method according to the invention may be performed regardless of the selected number of compression stages. The hydrogen stream that has been compressed to the desired final pressure is extracted from third compressor stage V3 via line 8, cooled in downstream third heat exchanger E3, and fed to third (high pressure) separator D3.

Again, the water precipitated in separator D3 is extracted via line 10 and fed via a collector line 11, which also collects water fractions 4 and 7 from the first two separators D1 and D2 to an intermediate storage tank S, which may have to be provided. Intermediate storage tank S serves to smooth the flow of water, which is then returned to electrolyzer E via line 12. Since this water is demineralized, it may be fed straight back into electrolyzer E, thus resulting in savings in terms of the water treatment for electrolyzer E.

The compressed hydrogen stream is drawn off via line 9 at the head of third separator D3 and forwarded to its subsequent application. The fraction of residual water in hydrogen stream 9 is below the required limit values. In this context, the concentration of water in hydrogen stream 9 may be adjusted using the temperature(s) of the coolant medium or media and/or the pressure stage ratios of the compressor stages implemented. The concentration of the water in the medium to be compressed varies linearly in the method according to the invention according to the compression ratio of the respective compression stage.

The use of a single-stage or a multistage compressor in which compression is carried out using an ionic liquid even makes it possible to transport water in the liquid form without damaging the compressor valves. In conventional dry running systems, the valves are designed to prevent any liquid from being forwarded. Since these valves run in the dry state, if they come into contact with water they lose their base lubrication and/or the valve material is attacked (corroded) by the water. When ionic liquids are used, this disadvantage does not occur because the valves are constantly lubricated by the ionic liquid and protected from direct contact with water, since they are permanently coated with a film of the ionic liquid.

What we claim is:

1. A method for compressing a gas-phase medium, wherein the medium may have a water content up to total saturation with water and wherein the medium is compressed in a single or multiple stages in at least one liquid-filled chamber, characterized in that an ionic liquid that is selected from the group consisting of a liquid that is not susceptible to attack by the water contained in the medium to be compressed and a liquid with low vapor pressure that is not susceptible to attack by the water contained in the medium to be compressed is used as the liquid and the compressed medium undergoes a water separation stage.

2. The method as recited in claim 1, characterized in that said gas-phase medium is selected from the group consisting of hydrogen and natural gas.

3. The method as recited in claim 1, characterized in that the compressed medium undergoes a water separation stage after each compression stage.

4. The method as recited in claim 1, characterized in that the compressed medium is cooled before being fed into the water separation stage.

5. The method as recited in claim 1, characterized in that EMIM mesylate is used as the ionic liquid.

6. The method as recited in claim 5, characterized in that the ionic liquid is selected from the group consisting of EMM mesylate with additive and 1-butyl-2,3-dimethyl imidazolium-bis(trifluoromethyl sulfonyl)imide.

7. The method as recited in claim 1, characterized in that said liquid is selected from the group consisting of perfluorinated polyether and thermal oil with low vapor pressure.

* * * * *